(12) United States Patent
Lau et al.

(10) Patent No.: US 11,682,056 B2
(45) Date of Patent: Jun. 20, 2023

(54) SYSTEMS AND METHODS FOR CONSUMER INTEGRATION INTO A POINT-OF-SALE SYSTEM

(71) Applicant: Savor Brands Inc., Honolulu, HI (US)

(72) Inventors: Mio L. K. Lau, Honolulu, HI (US);
Patrick C. W. Lau, Honolulu, HI (US);
Josué M. Gonzalez, Kapolei, HI (US);
Jayaraj Muthukumarasamy, San Jose, CA (US)

( * ) Notice: Subject to any disclaimer, the term of this patent is extended or adjusted under 35 U.S.C. 154(b) by 0 days.

(21) Appl. No.: 17/214,744

(22) Filed: Mar. 26, 2021

(65) Prior Publication Data

US 2021/0304267 A1    Sep. 30, 2021

Related U.S. Application Data

(60) Provisional application No. 63/001,115, filed on Mar. 27, 2020.

(51) Int. Cl.
*G06Q 30/02* (2023.01)
*G06Q 30/0601* (2023.01)
*G06Q 30/0251* (2023.01)
*G06Q 20/32* (2012.01)
*G06Q 10/087* (2023.01)

(52) U.S. Cl.
CPC ....... *G06Q 30/0601* (2013.01); *G06Q 10/087* (2013.01); *G06Q 20/325* (2013.01); *G06Q 30/0267* (2013.01)

(58) Field of Classification Search
CPC .............. G06Q 30/02; G06Q 30/0601; G06Q 30/0267; G06Q 20/325; G06Q 10/087; G06Q 30/0207–30/0277
See application file for complete search history.

(56) References Cited

U.S. PATENT DOCUMENTS

| | | | |
|---|---|---|---|
| 8,751,316 B1* | 6/2014 | Fletchall | G07G 1/0081 705/16 |
| 8,803,916 B1 | 8/2014 | Paczkowski et al. | |
| 9,026,459 B2* | 5/2015 | Fisher | G06Q 30/0238 235/382 |
| 9,600,811 B2* | 3/2017 | Fisher | G06Q 40/12 |
| 9,747,632 B2* | 8/2017 | Hicks | G06Q 30/0641 |
| 2007/0203792 A1* | 8/2007 | Rao | G06Q 20/326 705/16 |

(Continued)

OTHER PUBLICATIONS

International Search Report and Written Opinion for PCT/US21/24527 dated Jun. 10, 2021, 7 pages.

*Primary Examiner* — Thuy N Nguyen
(74) *Attorney, Agent, or Firm* — Procopio, Cory, Hargreaves & Savitvh, LLP

(57) ABSTRACT

A platform comprising storage; a plurality of APIs; a plurality of resources; and one or more servers, the servers configured to enable a plurality of partners to build and manage a mobile ordering and payment facilitation application comprising a front end application and a back end application, the front end application configured to enable customers of each partner to browse products, purchase, view purchase history, set up product favorites, receive direct marketing, and wherein the back end application allows the partner to fulfill orders, track orders, manage inventory and push direct marketing to customers.

10 Claims, 19 Drawing Sheets

(56) References Cited

U.S. PATENT DOCUMENTS

| | | | |
|---|---|---|---|
| 2008/0061985 A1* | 3/2008 | Strzelczyk | G06K 7/10346 340/10.5 |
| 2011/0225069 A1 | 9/2011 | Cramer et al. | |
| 2012/0218084 A1* | 8/2012 | Arponen | G06Q 30/0281 340/10.5 |
| 2013/0041781 A1* | 2/2013 | Freydberg | G06Q 30/06 705/27.1 |
| 2013/0103478 A1* | 4/2013 | Fisher | G06Q 30/0222 705/14.23 |
| 2013/0124326 A1 | 5/2013 | Huang et al. | |
| 2013/0134213 A1* | 5/2013 | Pallakoff | G06Q 30/00 235/375 |
| 2013/0155107 A1* | 6/2013 | Ashour | H04N 1/00342 345/633 |
| 2013/0246929 A1 | 9/2013 | Hoffman et al. | |
| 2013/0332343 A1* | 12/2013 | Desai | G06Q 20/40 705/39 |
| 2013/0339141 A1* | 12/2013 | Stibel | G06Q 30/0207 726/4 |
| 2013/0346172 A1* | 12/2013 | Wu | G06Q 30/0214 705/14.16 |
| 2014/0100994 A1* | 4/2014 | Tatzel | G06Q 30/0276 705/27.1 |
| 2014/0207680 A1* | 7/2014 | Rephlo | G06Q 20/401 705/44 |
| 2014/0236726 A1* | 8/2014 | Acosta | G06Q 30/0639 705/14.58 |
| 2014/0100997 A1 | 10/2014 | Mayerle et al. | |
| 2014/0358730 A1* | 12/2014 | Achan | G06Q 30/0623 705/26.61 |
| 2015/0269617 A1* | 9/2015 | Mikurak | G06Q 30/0633 705/14.54 |
| 2016/0132955 A1* | 5/2016 | Dabral | G06Q 30/0226 705/14.27 |
| 2017/0032382 A1* | 2/2017 | Shulman | G06Q 30/0185 |
| 2017/0124527 A1* | 5/2017 | Traina | G06Q 30/06 |
| 2017/0148046 A1* | 5/2017 | Akbarpour Mashadi | G06Q 30/0629 |
| 2017/0161728 A1* | 6/2017 | Satyanarayan | G06Q 20/42 |
| 2017/0221133 A1* | 8/2017 | Traina | G06Q 10/1095 |
| 2017/0228686 A1* | 8/2017 | Bermudez Rodriguez | G06Q 10/06315 |
| 2017/0344971 A1* | 11/2017 | Kargman | G06Q 50/12 |
| 2017/0352086 A1* | 12/2017 | Sharma | G06Q 30/0631 |
| 2018/0072555 A1* | 3/2018 | Fortunato | B67D 7/02 |
| 2018/0137533 A1* | 5/2018 | Pilarz | G06Q 30/0233 |
| 2018/0173896 A1* | 6/2018 | Arneson | G06F 21/6263 |
| 2019/0139121 A1* | 5/2019 | Broome | G06Q 30/0633 |
| 2019/0258814 A1* | 8/2019 | Heeter | G06K 19/06037 |
| 2020/0160267 A1* | 5/2020 | Thennadil | G06Q 10/0633 |
| 2020/0192706 A1* | 6/2020 | Huus | G06F 16/245 |
| 2020/0249660 A1* | 8/2020 | Rao | G05B 19/0428 |
| 2021/0335052 A1* | 10/2021 | Jeong | H04N 13/117 |

* cited by examiner

FIG. 7B ary, management and marketing skills. From ensuring that there's enough inventory to putting together monthly sales reports, these skills are necessary in ensuring that a store runs smoothly. Having an efficient point of sale (POS) system can go a long way in making sure that operations are running smoothly.

SYSTEMS AND METHODS FOR CONSUMER INTEGRATION INTO A POINT-OF-SALE SYSTEM

CROSS-REFERENCE TO RELATED APPLICATION(S)

This application claims the benefit of U.S. Provisional Application Ser. No. 63/001,115, filed on Mar. 27, 2020, which are expressly incorporated by reference herein in their entirety.

BACKGROUND

1. Technical Field

The embodiments described herein are related to a platform that enables mobile commerce, and more specifically that allows a consumer to be integrated with a mobile ordering and payment facilitation application and system via, e.g., the ability to experience augmented reality experiences triggered by a logo or other image on a product package.

2. Related Art

Operating a retail store calls for a range of administrative, management and marketing skills. From ensuring that there's enough inventory to putting together monthly sales reports, these skills are necessary in ensuring that a store runs smoothly. Having an efficient point of sale (POS) system can go a long way in making sure that operations are running smoothly.

A point of sale system, or POS, is the place where a customer makes a payment for products or services in a store. Simply put, every time a customer makes a purchase, they're completing a point of sale transaction. A conventional POS serves as the central component of a business; it's the hub where everything—like sales, inventory and customer management—merges.

The physical components of a conventional POS system include:
1. Monitor/tablet: Displays the product database and enables other functions, such as employee clock-in and viewing sales reports. Tablets—especially iPads—are popular for replacing bulkier monitors.
2. Barcode scanner: Automates the checkout process. Scanning barcodes pulls product info and adds it to the checkout total. Barcode scanners can also integrate with inventory management systems to automatically adjust stock levels.
3. Credit card reader: Since the EMV payment standard went live in 2015, secure and EMV-compliant credit card readers are a must-have. Non-compliant retailers face potentially huge losses on account of fraud liability.
4. Receipt printer: Email and text receipts may be gaining popularity, but paper receipts remain essential for providing customers with a quick snapshot of their purchase or returns.
5. Cash drawer: It may fade away in years to come, but cash is still king. Until then, you'll need a secure place to store cash for transactions. Another benefit of cash: there are no associated credit card fees.
6. Sales Reporting: On the surface, most POS systems enable you to look at your sales. The difference lies in how those numbers are presented, the ease at which data can be accessed and how much detail you get.

A conventional POS system can generate detailed sales reports (based on product, hour, employee, total cost of items sold, total retail amount, net profit, profit percentage, gross margin) and provide quick snapshots and charts on your store's sales performance. One of the most important functions of a POS system, inventory management, at its very essence, keeps track of all products so a business owner knows when it's time to order/or not order specific products. A POS should also have customer relationship management (CRM) to track all customer data, and have the ability to set sales targets as well as know who top performers are and who requires extra coaching will help increase sales.

A conventional POS system also must integrate mobile, or e-commerce as well.

Conventional POS systems do not however, integrate the consumer experience into to system. While some POS systems can accept mobile payment the consumer is not otherwise integrated into the POS system, e.g., through a mobile or browser application. Moreover, the suppliers are typically not integrated either.

SUMMARY

Systems and methods for a platform that enables mobile commerce and that allows a consumer to be integrated with a mobile ordering and payment facilitation application and system via, e.g., the ability to experience augmented reality experiences triggered by a logo or other image on a product package are described herein.

These and other features, aspects, and embodiments are described below in the section entitled "Detailed Description."

BRIEF DESCRIPTION OF THE DRAWINGS

Features, aspects, and embodiments are described in conjunction with the attached drawings, in which:

FIGS. 2A-2J are screen shots illustrating various aspects of the consumer experience present via the front end application;

FIGS. 7A and 7B are screen shots illustrating screens from a partner UI according to one example implementation.

DETAILED DESCRIPTION

Figure 1:
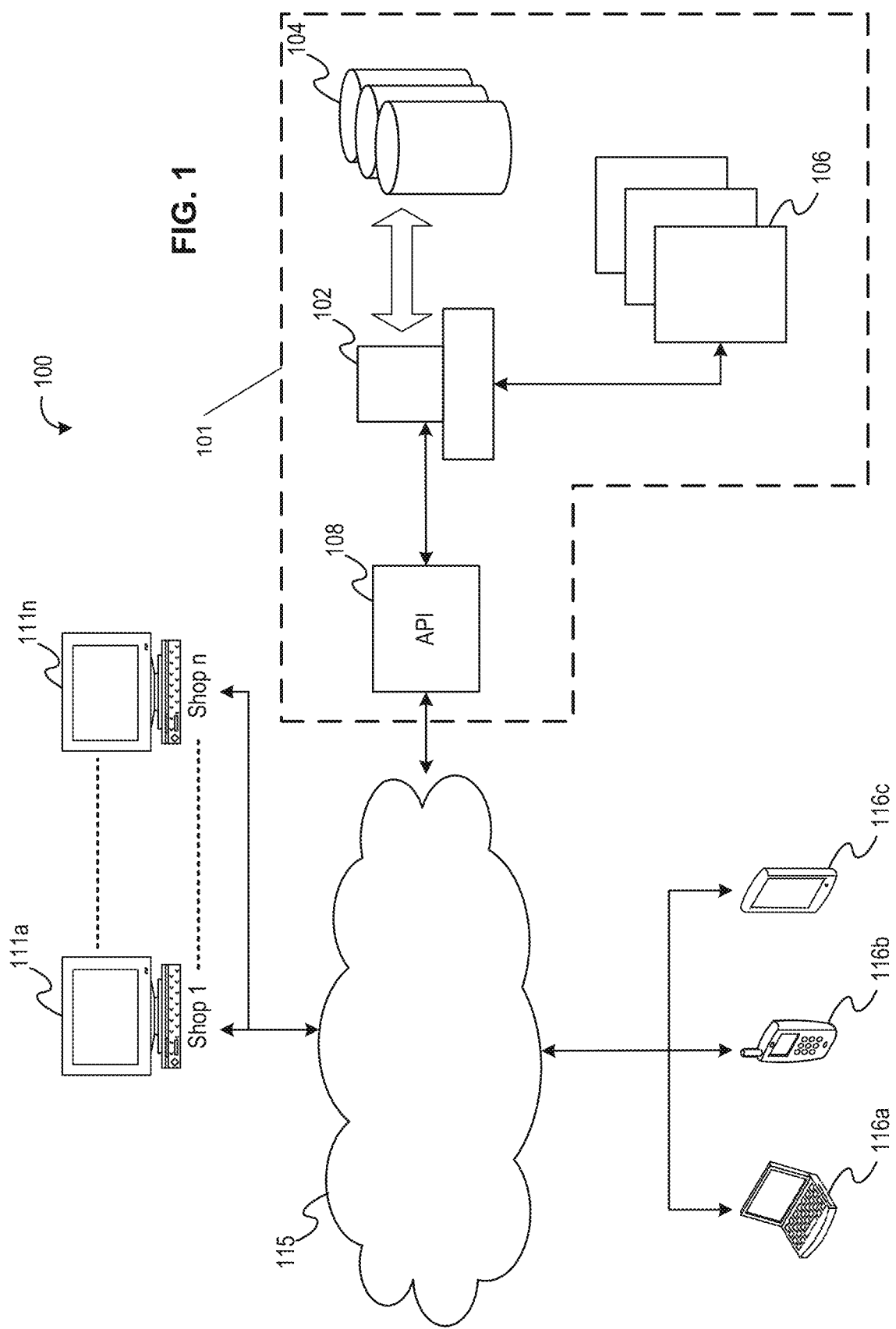
FIG. 1 is a diagram illustrating an example integrated mobile ordering and payment facilitation system in accordance with one embodiment.

The disclosure and the various features and advantageous details thereof are explained more fully with reference to the non-limiting embodiments and examples that are described and/or illustrated in the accompanying drawings and detailed in the following. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the disclosure. The examples used herein are intended merely to facilitate an understanding of ways in which the disclosure may be practiced and to further enable those of skill in the art to practice the embodiments of the disclosure. Accordingly, the examples and embodiments herein should not be construed as limiting the scope of the disclosure. Moreover, it is noted that like reference numerals represent similar parts throughout the several views of the drawings.

Figure 5:
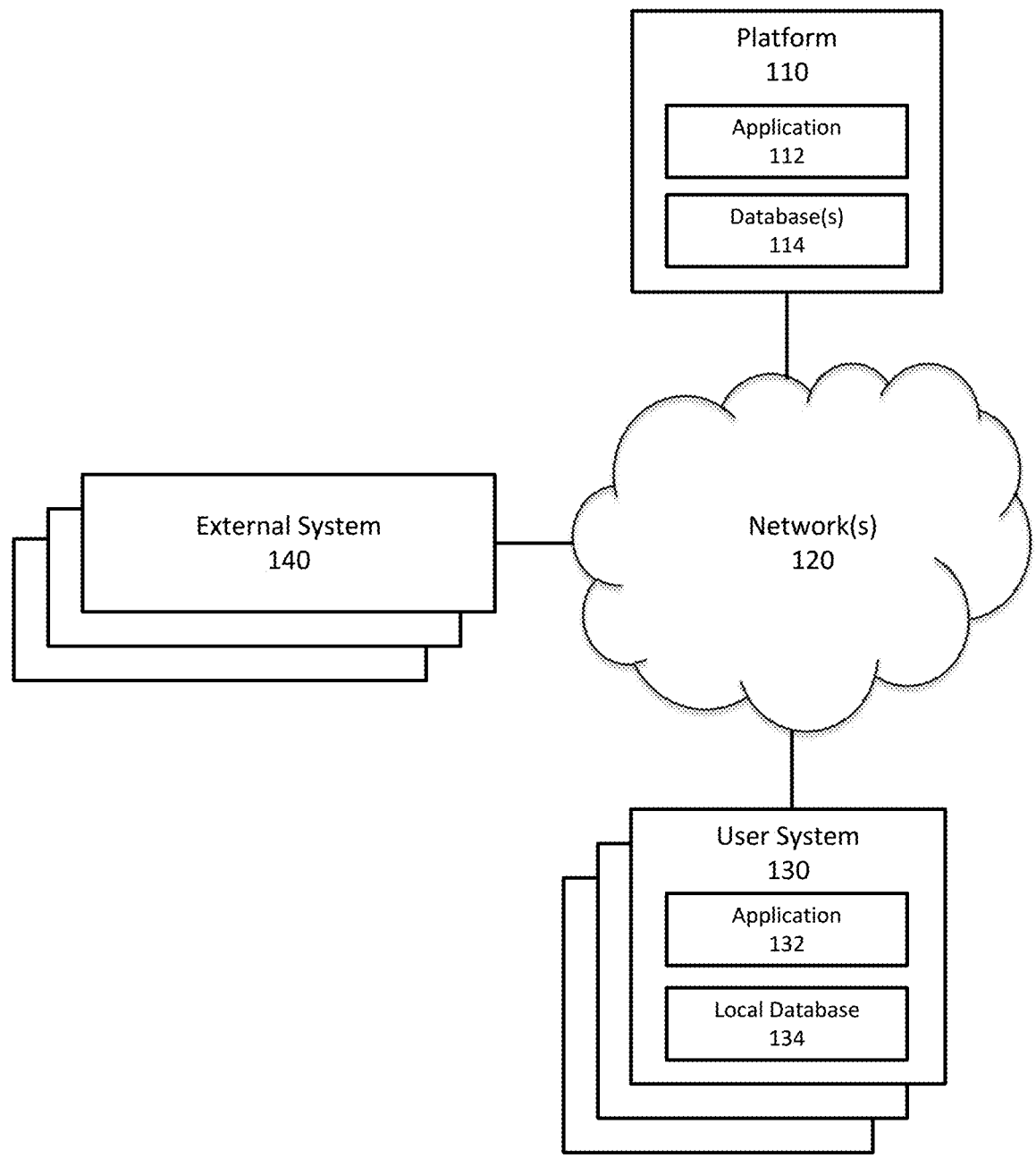
FIG. 5 illustrates an example processing system, by which one or more of the processes described herein, may be executed, according to an embodiment.

FIG. 5 illustrates an example infrastructure in which one or more of the disclosed processes may be implemented, according to an embodiment. The infrastructure may comprise a platform 110 (e.g., one or more servers) which hosts and/or executes one or more of the various functions, processes, methods, and/or software modules described herein. Platform 110 may comprise dedicated servers, or may instead comprise cloud instances, which utilize shared resources of one or more servers. These servers or cloud instances may be collocated and/or geographically distributed. Platform 110 may also comprise or be communicatively connected to a server application 112 and/or one or more databases 114. In addition, platform 110 may be communicatively connected to one or more user systems 130 via one or more networks 120. Platform 110 may also be communicatively connected to one or more external systems 140 (e.g., other platforms, websites, etc.) via one or more networks 120.

Network(s) 120 may comprise the Internet, and platform 110 may communicate with user system(s) 130 through the Internet using standard transmission protocols, such as HyperText Transfer Protocol (HTTP), HTTP Secure (HTTPS), File Transfer Protocol (FTP), FTP Secure (FTPS), Secure Shell FTP (SFTP), and the like, as well as proprietary protocols. While platform 110 is illustrated as being connected to various systems through a single set of network(s) 120, it should be understood that platform 110 may be connected to the various systems via different sets of one or more networks. For example, platform 110 may be connected to a subset of user systems 130 and/or external systems 140 via the Internet, but may be connected to one or more other user systems 130 and/or external systems 140 via an intranet. Furthermore, while only a few user systems 130 and external systems 140, one server application 112, and one set of database(s) 114 are illustrated, it should be understood that the infrastructure may comprise any number of user systems, external systems, server applications, and databases.

User system(s) 130 may comprise any type or types of computing devices capable of wired and/or wireless communication, including without limitation, desktop computers, laptop computers, tablet computers, smart phones or other mobile phones, servers, game consoles, televisions, set-top boxes, electronic kiosks, point-of-sale terminals, Automated Teller Machines, and/or the like.

Platform 110 may comprise web servers which host one or more websites and/or web services. In embodiments in which a website is provided, the website may comprise a graphical user interface, including, for example, one or more screens (e.g., webpages) generated in HyperText Markup Language (HTML) or other language. Platform 110 transmits or serves one or more screens of the graphical user interface in response to requests from user system(s) 130. In some embodiments, these screens may be served in the form of a wizard, in which case two or more screens may be served in a sequential manner, and one or more of the sequential screens may depend on an interaction of the user or user system 130 with one or more preceding screens. The requests to platform 110 and the responses from platform 110, including the screens of the graphical user interface, may both be communicated through network(s) 120, which may include the Internet, using standard communication protocols (e.g., HTTP, HTTPS, etc.). These screens (e.g., webpages) may comprise a combination of content and elements, such as text, images, videos, animations, references (e.g., hyperlinks), frames, inputs (e.g., textboxes, text areas, checkboxes, radio buttons, drop-down menus, buttons, forms, etc.), scripts (e.g., JavaScript), and the like, including elements comprising or derived from data stored in one or more databases (e.g., database(s) 114) that are locally and/or remotely accessible to platform 110. Platform 110 may also respond to other requests from user system(s) 130.

Platform 110 may further comprise, be communicatively coupled with, or otherwise have access to one or more database(s) 114. For example, platform 110 may comprise one or more database servers which manage one or more databases 114. A user system 130 or server application 112 executing on platform 110 may submit data (e.g., user data, form data, etc.) to be stored in database(s) 114, and/or request access to data stored in database(s) 114. Any suitable database may be utilized, including without limitation MySQL™, Oracle™ IBM™, Microsoft SQL™, Access™, PostgreSQL™, and the like, including cloud-based databases and proprietary databases. Data may be sent to platform 110, for instance, using the well-known POST request supported by HTTP, via FTP, and/or the like. This data, as well as other requests, may be handled, for example, by server-side web technology, such as a servlet or other software module (e.g., comprised in server application 112), executed by platform 110.

In embodiments in which a web service is provided, platform 110 may receive requests from external system(s) 140, and provide responses in eXtensible Markup Language (XML), JavaScript Object Notation (JSON), and/or any other suitable or desired format. In such embodiments, platform 110 may provide an application programming interface (API) which defines the manner in which user system(s) 130 and/or external system(s) 140 may interact with the web service. Thus, user system(s) 130 and/or external system(s) 140 (which may themselves be servers), can define their own user interfaces, and rely on the web service to implement or otherwise provide the backend processes, methods, functionality, storage, and/or the like, described herein. For example, in such an embodiment, a client application 132 executing on one or more user system(s) 130 may interact with a server application 112 executing on platform 110 to execute one or more or a portion of one or more of the various functions, processes, methods, and/or software modules described herein. Client application 132 may be "thin," in which case processing is primarily carried out server-side by server application 112 on platform 110. A basic example of a thin client application 132 is a browser application, which simply requests, receives, and renders webpages at user system(s) 130, while server application 112 on platform 110 is responsible for generating the webpages and managing database functions. Alternatively, the client application may be "thick," in which case processing is primarily carried out client-side by user system(s) 130. It should be understood that client application 132 may perform an amount of processing, relative to server application 112 on platform 110, at any point along this spectrum between "thin" and "thick," depending on the design goals of the particular implementation. In any case, the application described herein, which may wholly reside on either platform 110 (e.g., in which case server application 112 performs all processing) or user system(s) 130 (e.g., in which case client application 132 performs all processing) or be distributed between platform 110 and user system(s) 130 (e.g., in which case server application 112 and client application 132 both perform processing), can comprise one or more executable software modules that implement one or more of the processes, methods, or functions of the application described herein.

Figure 4:
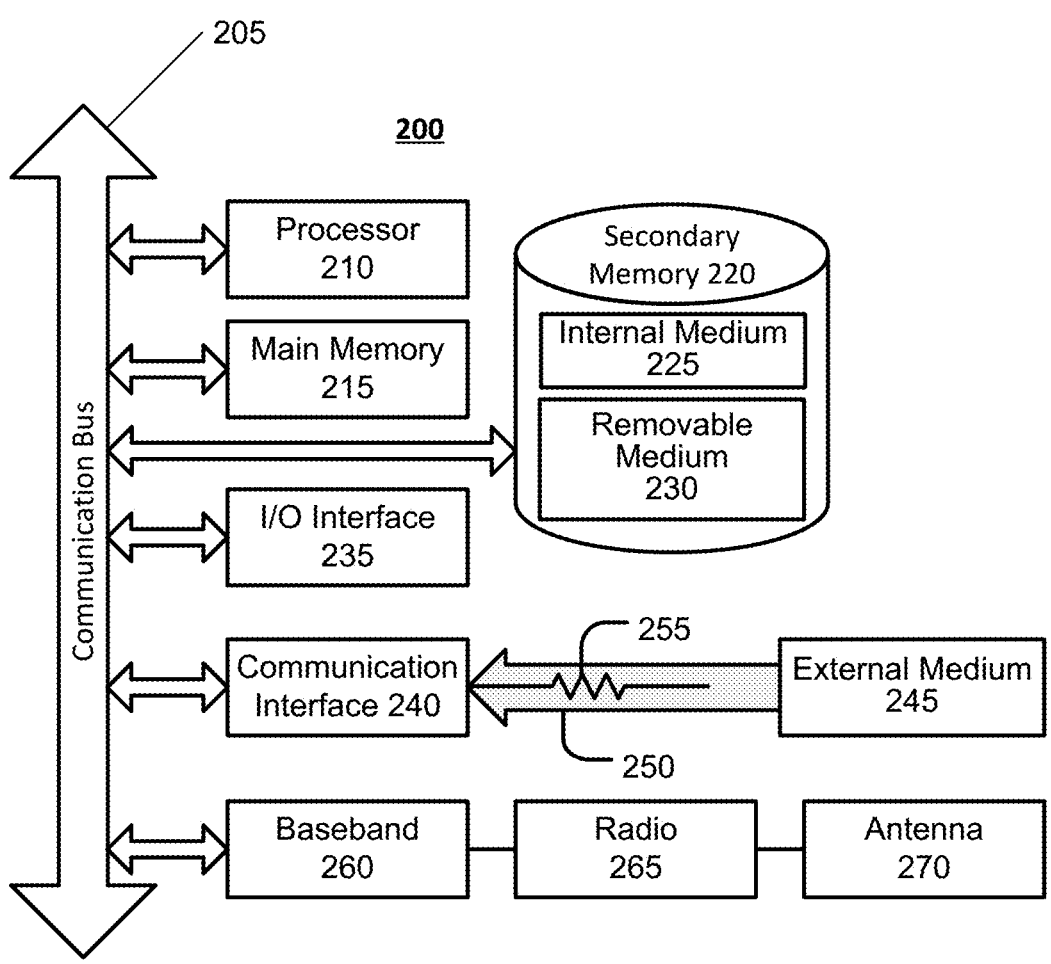
FIG. 4 illustrates an example infrastructure, in which one or more of the processes described herein, may be implemented, according to an embodiment.

FIG. 4 is a block diagram illustrating an example wired or wireless system 200 that may be used in connection with various embodiments described herein. For example, system 200 may be used as or in conjunction with one or more of the functions, processes, or methods (e.g., to store and/or execute the application or one or more software modules of the application) described herein, and may represent components of platform 110, user system(s) 130, external system(s) 140, and/or other processing devices described herein. System 200 can be a server or any conventional personal computer, or any other processor-enabled device that is capable of wired or wireless data communication. Other computer systems and/or architectures may be also used, as will be clear to those skilled in the art.

System 200 preferably includes one or more processors, such as processor 210. Additional processors may be provided, such as an auxiliary processor to manage input/output, an auxiliary processor to perform floating-point mathematical operations, a special-purpose microprocessor having an architecture suitable for fast execution of signal-processing algorithms (e.g., digital-signal processor), a slave processor subordinate to the main processing system (e.g., back-end processor), an additional microprocessor or controller for dual or multiple processor systems, and/or a coprocessor. Such auxiliary processors may be discrete processors or may be integrated with processor 210. Examples of processors which may be used with system 200 include, without limitation, the Pentium® processor, Core i7® processor, and Xeon® processor, all of which are available from Intel Corporation of Santa Clara, Calif.

Processor 210 is preferably connected to a communication bus 205. Communication bus 205 may include a data channel for facilitating information transfer between storage and other peripheral components of system 200. Furthermore, communication bus 205 may provide a set of signals used for communication with processor 210, including a data bus, address bus, and/or control bus (not shown). Communication bus 205 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/S-100, and/or the like.

System 200 preferably includes a main memory 215 and may also include a secondary memory 220. Main memory 215 provides storage of instructions and data for programs executing on processor 210, such as one or more of the functions and/or modules discussed herein. It should be understood that programs stored in the memory and executed by processor 210 may be written and/or compiled according to any suitable language, including without limitation C/C++, Java, JavaScript, Perl, Visual Basic, .NET, and the like. Main memory 215 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

Secondary memory 220 may optionally include an internal medium 225 and/or a removable medium 230. Removable medium 230 is read from and/or written to in any well-known manner. Removable storage medium 230 may be, for example, a magnetic tape drive, a compact disc (CD) drive, a digital versatile disc (DVD) drive, other optical drive, a flash memory drive, and/or the like.

Secondary memory 220 is a non-transitory computer-readable medium having computer-executable code (e.g., disclosed software modules) and/or other data stored thereon. The computer software or data stored on secondary memory 220 is read into main memory 215 for execution by processor 210.

In alternative embodiments, secondary memory 220 may include other similar means for allowing computer programs or other data or instructions to be loaded into system 200. Such means may include, for example, a communication interface 240, which allows software and data to be transferred from external storage medium 245 to system 200. Examples of external storage medium 245 may include an external hard disk drive, an external optical drive, an external magneto-optical drive, and/or the like. Other examples of secondary memory 220 may include semiconductor-based memory, such as programmable read-only memory (PROM), erasable programmable read-only memory (EPROM), electrically erasable read-only memory (EEPROM), and flash memory (block-oriented memory similar to EEPROM).

As mentioned above, system 200 may include a communication interface 240. Communication interface 240 allows software and data to be transferred between system 200 and external devices (e.g. printers), networks, or other information sources. For example, computer software or executable code may be transferred to system 200 from a network server (e.g., platform 110) via communication interface 240. Examples of communication interface 240 include a built-in network adapter, network interface card (NIC), Personal Computer Memory Card International Association (PCMCIA) network card, card bus network adapter, wireless network adapter, Universal Serial Bus (USB) network adapter, modem, a wireless data card, a communications port, an infrared interface, an IEEE 1394 fire-wire, and any other device capable of interfacing system 200 with a network (e.g., network(s) 120) or another computing device. Communication interface 240 preferably implements industry-promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software and data transferred via communication interface 240 are generally in the form of electrical communication signals 255. These signals 255 may be provided to communication interface 240 via a communication channel 250. In an embodiment, communication channel 250 may be a wired or wireless network (e.g., network(s) 120), or any variety of other communication links. Communication channel 250 carries signals 255 and can be implemented using a variety of wired or wireless communication means including wire or cable, fiber optics, conventional phone line, cellular phone link, wireless data communication link, radio frequency ("RF") link, or infrared link, just to name a few.

Computer-executable code (e.g., computer programs, such as the disclosed application, or software modules) is stored in main memory 215 and/or secondary memory 220. Computer programs can also be received via communication interface 240 and stored in main memory 215 and/or secondary memory 220. Such computer programs, when executed, enable system 200 to perform the various functions of the disclosed embodiments as described elsewhere herein.

In this description, the term "computer-readable medium" is used to refer to any non-transitory computer-readable storage media used to provide computer-executable code and/or other data to or within system 200. Examples of such media include main memory 215, secondary memory 220 (including internal memory 225, removable medium 230, and external storage medium 245), and any peripheral device communicatively coupled with communication interface 240 (including a network information server or other network device). These non-transitory computer-readable media are means for providing executable code, programming instructions, software, and/or other data to system 200.

In an embodiment that is implemented using software, the software may be stored on a computer-readable medium and loaded into system 200 by way of removable medium 230, I/O interface 235, or communication interface 240. In such an embodiment, the software is loaded into system 200 in the form of electrical communication signals 255. The software, when executed by processor 210, preferably causes processor 210 to perform one or more of the processes and functions described elsewhere herein.

In an embodiment, I/O interface 235 provides an interface between one or more components of system 200 and one or more input and/or output devices. Example input devices include, without limitation, sensors, keyboards, touch screens or other touch-sensitive devices, biometric sensing devices, computer mice, trackballs, pen-based pointing devices, and/or the like. Examples of output devices include, without limitation, other processing devices, cathode ray tubes (CRTs), plasma displays, light-emitting diode (LED) displays, liquid crystal displays (LCDs), printers, vacuum fluorescent displays (VFDs), surface-conduction electron-emitter displays (SEDs), field emission displays (FEDs), and/or the like. In some cases, an input and output device may be combined, such as in the case of a touch panel display (e.g., in a smartphone, tablet, or other mobile device).

System 200 may also include optional wireless communication components that facilitate wireless communication over a voice network and/or a data network (e.g., in the case of user system 130). The wireless communication components comprise an antenna system 270, a radio system 265, and a baseband system 260. In system 200, radio frequency (RF) signals are transmitted and received over the air by antenna system 270 under the management of radio system 265.

In an embodiment, antenna system 270 may comprise one or more antennae and one or more multiplexors (not shown) that perform a switching function to provide antenna system 270 with transmit and receive signal paths. In the receive path, received RF signals can be coupled from a multiplexor to a low noise amplifier (not shown) that amplifies the received RF signal and sends the amplified signal to radio system 265.

In an alternative embodiment, radio system 265 may comprise one or more radios that are configured to communicate over various frequencies. In an embodiment, radio system 265 may combine a demodulator (not shown) and modulator (not shown) in one integrated circuit (IC). The demodulator and modulator can also be separate components. In the incoming path, the demodulator strips away the RF carrier signal leaving a baseband receive audio signal, which is sent from radio system 265 to baseband system 260.

If the received signal contains audio information, then baseband system 260 decodes the signal and converts it to an analog signal. Then the signal is amplified and sent to a speaker. Baseband system 260 also receives analog audio signals from a microphone. These analog audio signals are converted to digital signals and encoded by baseband system 260. Baseband system 260 also encodes the digital signals for transmission and generates a baseband transmit audio signal that is routed to the modulator portion of radio system 265. The modulator mixes the baseband transmit audio signal with an RF carrier signal, generating an RF transmit signal that is routed to antenna system 270 and may pass through a power amplifier (not shown). The power amplifier amplifies the RF transmit signal and routes it to antenna system 270, where the signal is switched to the antenna port for transmission.

Baseband system 260 is also communicatively coupled with processor 210, which may be a central processing unit (CPU). Processor 210 has access to data storage areas 215 and 220. Processor 210 is preferably configured to execute instructions (i.e., computer programs, such as the disclosed application, or software modules) that can be stored in main memory 215 or secondary memory 220. Computer programs can also be received from baseband processor 260 and stored in main memory 210 or in secondary memory 220, or executed upon receipt. Such computer programs, when executed, enable system 200 to perform the various functions of the disclosed embodiments.

Embodiments of processes for the consumer to be integrated with a mobile ordering and payment facilitation application will now be described in detail. It should be understood that the described processes may be embodied in one or more software modules that are executed by one or more hardware processors (e.g., processor 210), for example, as the application discussed herein (e.g., server application 112, client application 132, and/or a distributed application comprising both server application 112 and client application 132), which may be executed wholly by processor(s) of platform 110, wholly by processor(s) of user system(s) 130, or may be distributed across platform 110 and user system(s) 130, such that some portions or modules of the application are executed by platform 110 and other portions or modules of the application are executed by user system(s) 130. The described processes may be implemented as instructions represented in source code, object code, and/or machine code. These instructions may be executed directly by hardware processor(s) 210, or alternatively, may be executed by a virtual machine operating between the object code and hardware processors 210. In addition, the disclosed application may be built upon or interfaced with one or more existing systems.

Alternatively, the described processes may be implemented as a hardware component (e.g., general-purpose processor, integrated circuit (IC), application-specific integrated circuit (ASIC), digital signal processor (DSP), field-programmable gate array (FPGA) or other programmable logic device, discrete gate or transistor logic, etc.), combination of hardware components, or combination of hardware and software components. To clearly illustrate the interchangeability of hardware and software, various illustrative components, blocks, modules, circuits, and steps are described herein generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a component, block, module, circuit, or step is for ease of description. Specific functions or steps can be moved from one component, block, module, circuit, or step to another without departing from the invention.

Furthermore, while the processes, described herein, are illustrated with a certain arrangement and ordering of subprocesses, each process may be implemented with fewer, more, or different subprocesses and a different arrangement and/or ordering of subprocesses. In addition, it should be understood that any subprocess, which does not depend on the completion of another subprocess, may be executed before, after, or in parallel with that other independent subprocess, even if the subprocesses are described or illustrated in a particular order.

FIG. 1 is a diagram illustrating an example mobile ordering and payment facilitation system 100 in accordance with one example embodiment. At the core of system 100 is platform 101, which can include all or some of the aspects of platform 110 that facilitates mobile ordering and payment as described herein. As can be seen, platform 101 comprises one or more servers 102 interfaces with one or more storage devices 104, resources 106, and makes available API's 108.

One or more partners 111a-111n, e.g., store owners, can use the API's 108 and resources to access servers 102, e.g., via network 115, in order to build and manage a mobile ordering and payment facilitation application. Such an application can be hosted by platform 101, e.g., a cloud based implementation, or can be hosted on the premise of a partner 111a-111n.

The application can comprise a customizable front end application that can be downloaded by customers onto a customer device 116. The customer can then use the application to access a back end application, e.g., hosted on platform 101, which can provide a mobile customer experience. Multiple customer devices 116a-c are illustrated and in general a customer device can comprise a tablet, smartphone, laptop, or desktop computing device. Customer can, in certain embodiments access the back end application via a browser on their device 116 as well.

The customized front end application can allow the consumer to browse offerings, get information about offerings, make purchases, store a history of purchases, and include a shopping cart for mobile ordering/purchases with an option for "Favorites".

Figure 2A:
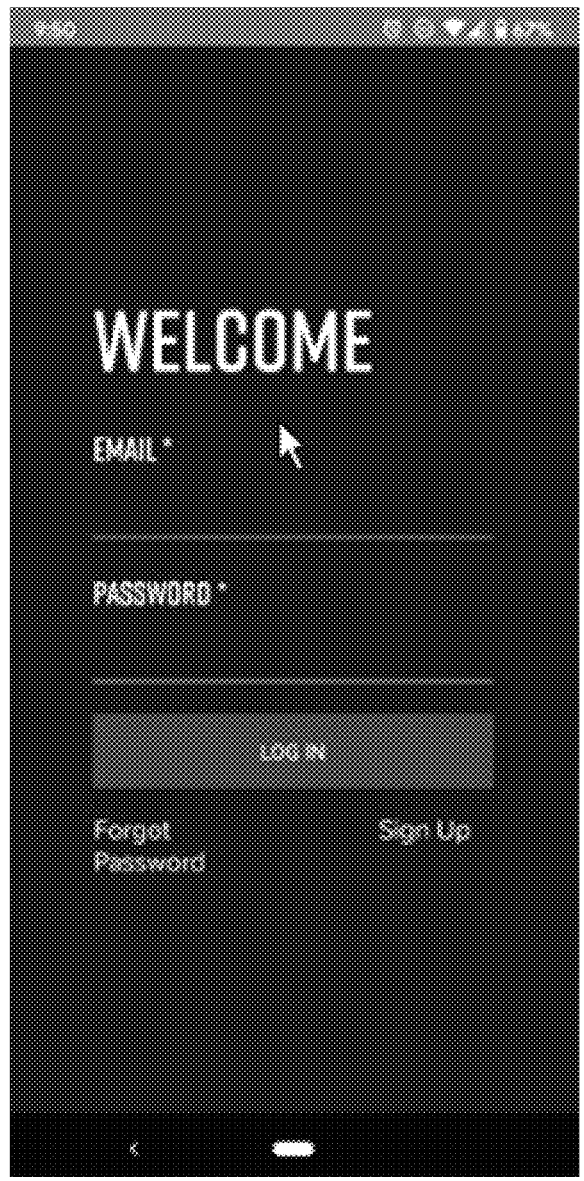
Figure 2B:
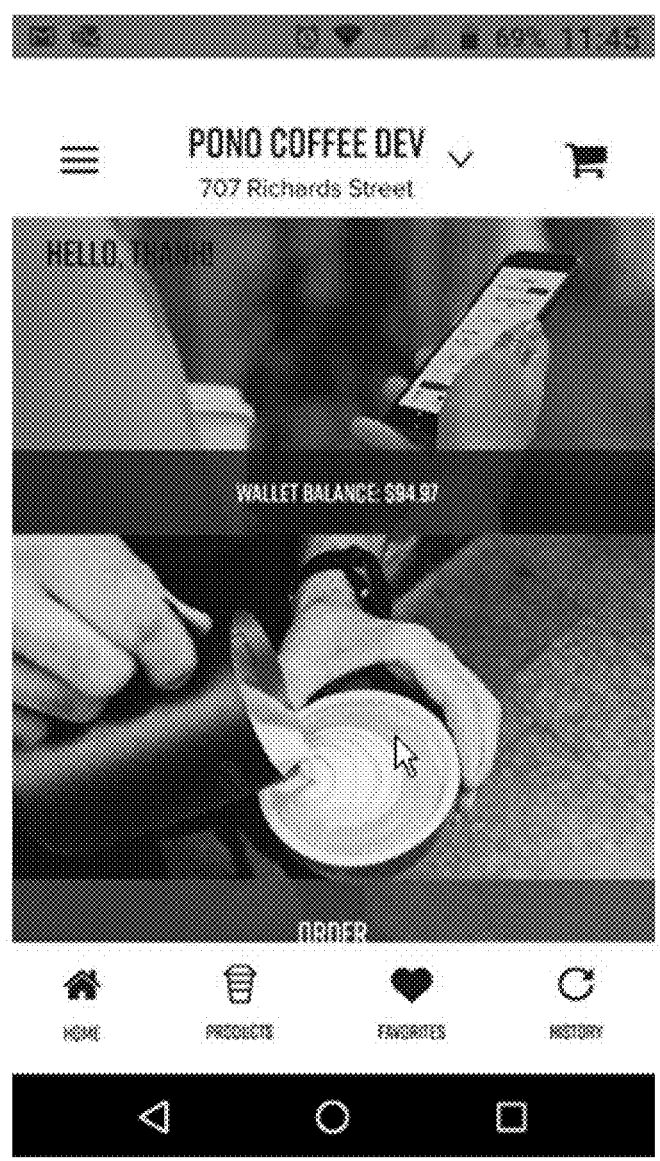
Figure 2C:
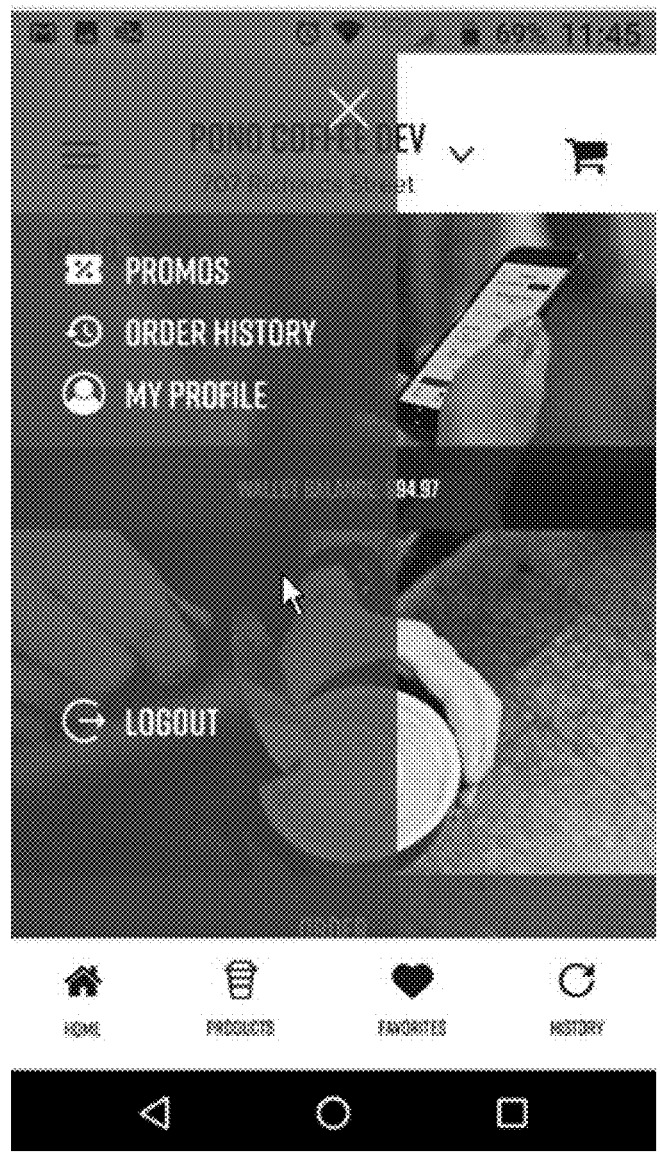

FIGS. 2A-J are screen shots illustrating various aspects of the consumer experience present via the front end application. As illustrated in the screen shot of FIG. 2A, the customer can login and be brought to a home page such as the one illustrated in the screen shot of FIG. 2B. As can be seen, the consumer can access products, favorites and their order history directly from the home page. As illustrated in FIG. 2C, the consumer can also access a menu that allows them to access promotions, which are described in more detail below, as well as their profile.

Figure 2D:
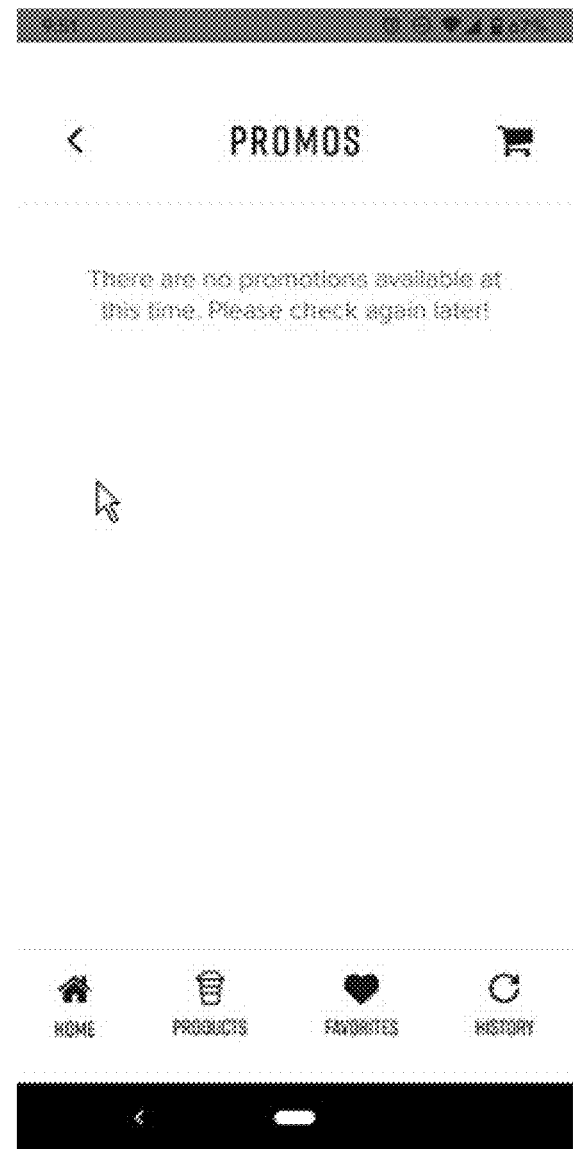

As illustrated in FIG. 2D, if the consumer chooses to access promotions they can be taken to the promotion screen, which can list any promotions. As can be seen, the promotion screen can include a shopping cart link so that the consumer can quickly add the promotion to their shopping cart.

Figure 2E:
Figure 2F:
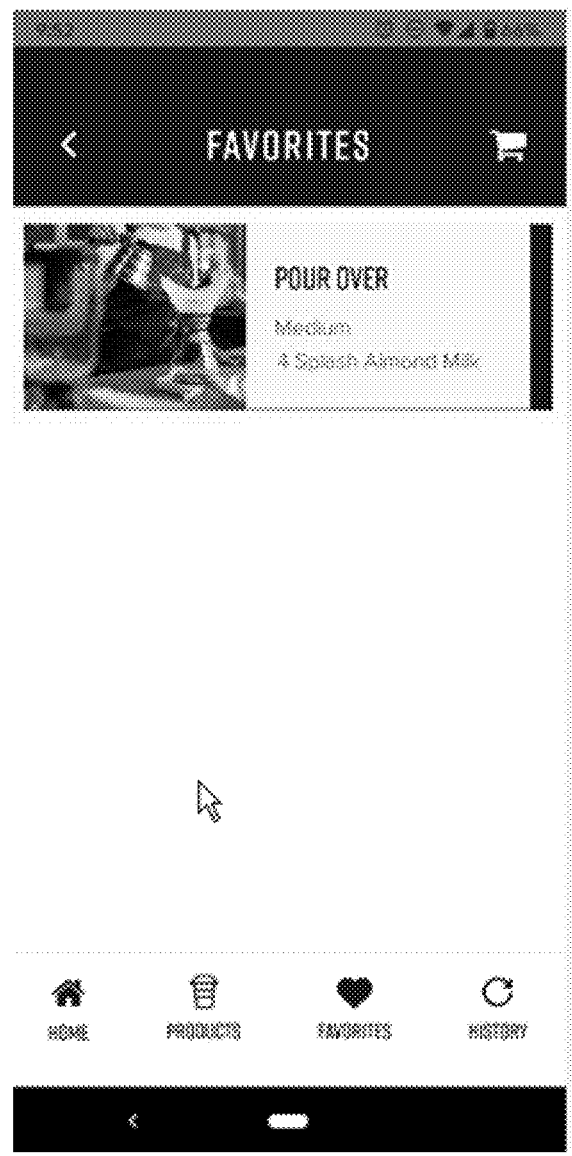
Figure 2G:

Beyond promotions, the consumer can browse products by category as illustrated in the screen shot of FIG. 2E, or they can browse their favorites as illustrated in the screen shot of FIG. 2F. If the consumer can "click" or "tap" in product in order to get further information about the product as illustrated in the screen shot of FIG. 2G. As can be seen, each of these screens, the shopping cart is available to allow the consumer to quickly add the product to their shopping cart.

Figure 2H:
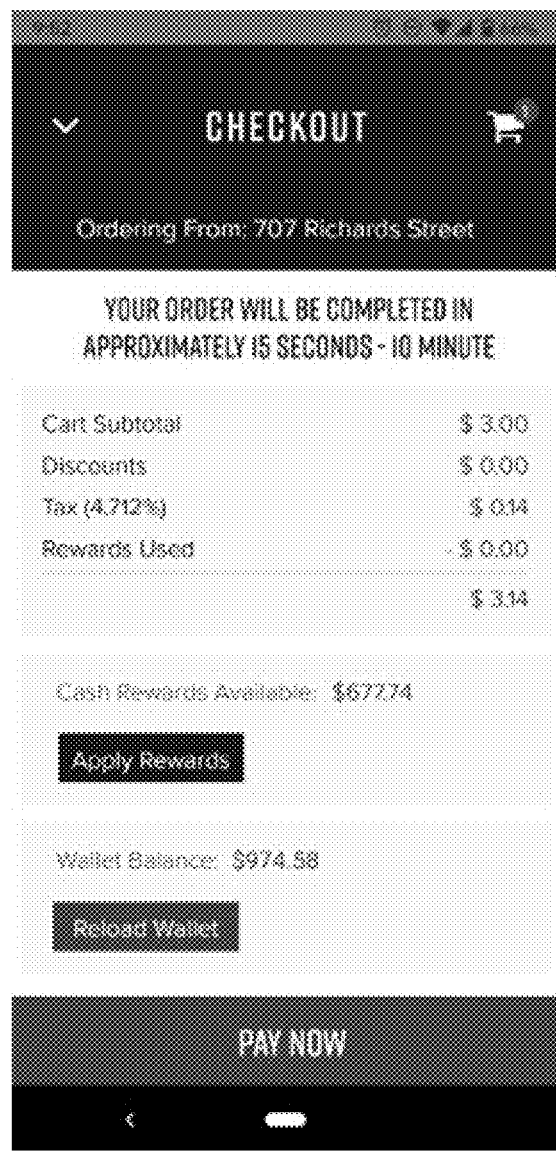
Figure 21:
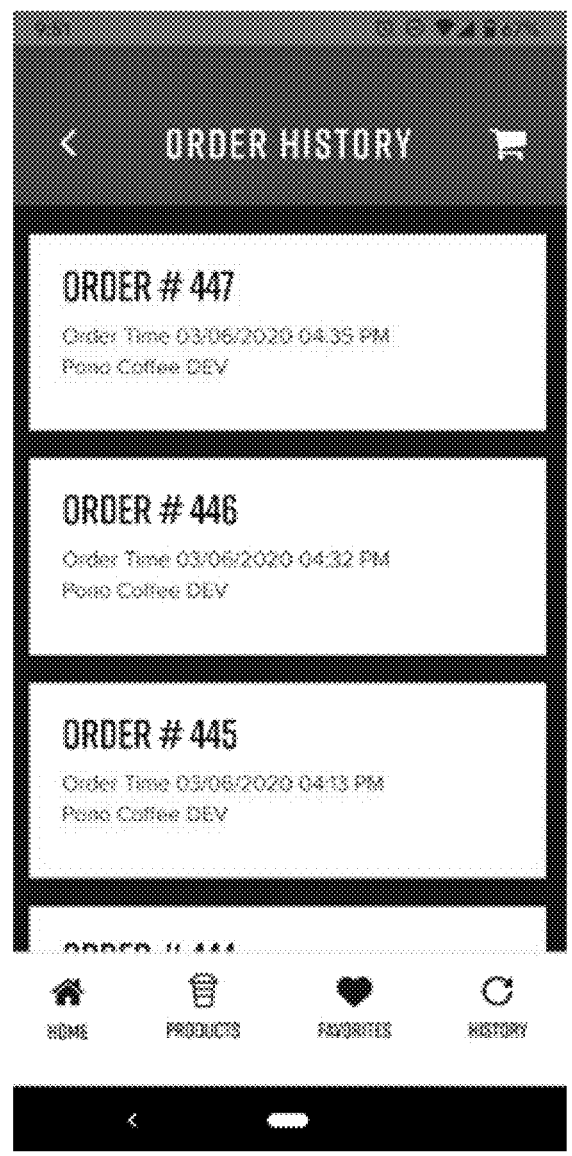
Figure 2J:

Once the consumer is ready to check out, they can access the checkout screen illustrated in FIG. 2H. As can be seen the consumer can be given the option to apply rewards, e.g., from a loyalty program as described below, or use the balance in their wallet, also described below. In addition to favorites, the consumer can also access their order history as illustrated by the screen shot in FIG. 2I, where they can get order history detail by selecting one of the orders on the order screen, as illustrated by the order history detail screen of FIG. 2J. As can be seen the consumer can also quickly reorder a previous order via the shopping cart link, or the re-order button.

As mentioned above, the partner 110 can provide consumers an E-Wallet that can actually allow the partner the ability to collect money upfront, which improves cash flow for the business 110. Similarly, in some implementations, the application can also enable E-Gifting that allows retail users to give digital gift cards to other users. In certain embodiments, the consumer can also use the wallet to make POS purchases.

Platform 101 also enables the partner 110 to provide a cash rewards loyalty program.

Moreover, the application can also provide for an integrated experience within the physical partner location. For example, in certain embodiments, partner administrators of the application can configure different triggers that correspond to logos or other images on packaging within the partner location. The front end application can be configured to access the device 116 camera (not shown) to allow the consumer to "waive" the device over a package. Computer vision in the front end application or back end application can then recognize a trigger and launch a video related to the product. In certain embodiments, the logo, or other trigger image is transitioned, i.e., becomes alive, and animated as the image transitions in to the video.

The video can explain the background of a product, how to make a certain product, how to use the product, different recipes that include the product, different experiences of user's/purchaser's of the product, etc. Moreover, the videos can change over time, or with the number of times a particular user triggers the video.

In certain embodiments, the video can include a buy or reorder button.

As such the consumer through their mobile application is now integrated with the partner's store operations. The front end application lets the consumer order, track orders and history, get product information, etc. importantly the orders and the data the consumer can track are being pushed-pulled directly into or form the POS system. As such, when a user waives their phone over a product, reviews the video, gets other information and then "presses" the order button, the order is put directly in the POS system.

Moreover, the user's wallet can be debited for the purchase, so the partner is compensated immediately.

The partner employees can also be tied in for fulfillment purposes. For example, the API's 108 and resources 106 can be used to configure a front end fulfillment application that can be loaded on a device 116 and can allow the employees to see mobile orders and fulfill them. For example, if the partner is a coffee shop, then the baristas can see mobile orders and pick up times, etc., and fulfill those orders as they come in. The application can even allow the partner to track the time involved with fulfillment, e.g., the time it takes a barista to fulfill a drink order.

The Partner administrator can push communication to the customers via the front end application. For example, the partner can push cash reward offers and other promotions and direct marketing communications. If the offers or rewards are accepted, they can be added to the user's wallet for use in paying for orders.

The platform 101 can provide, e.g., via a portal access to data analytics and various data set reporting, e.g., sales, inventory, etc. The data available can assist with inventory management, e.g., data analytics can be used to determine when and what inventory to replenish and identify slippage.

Figure 3:
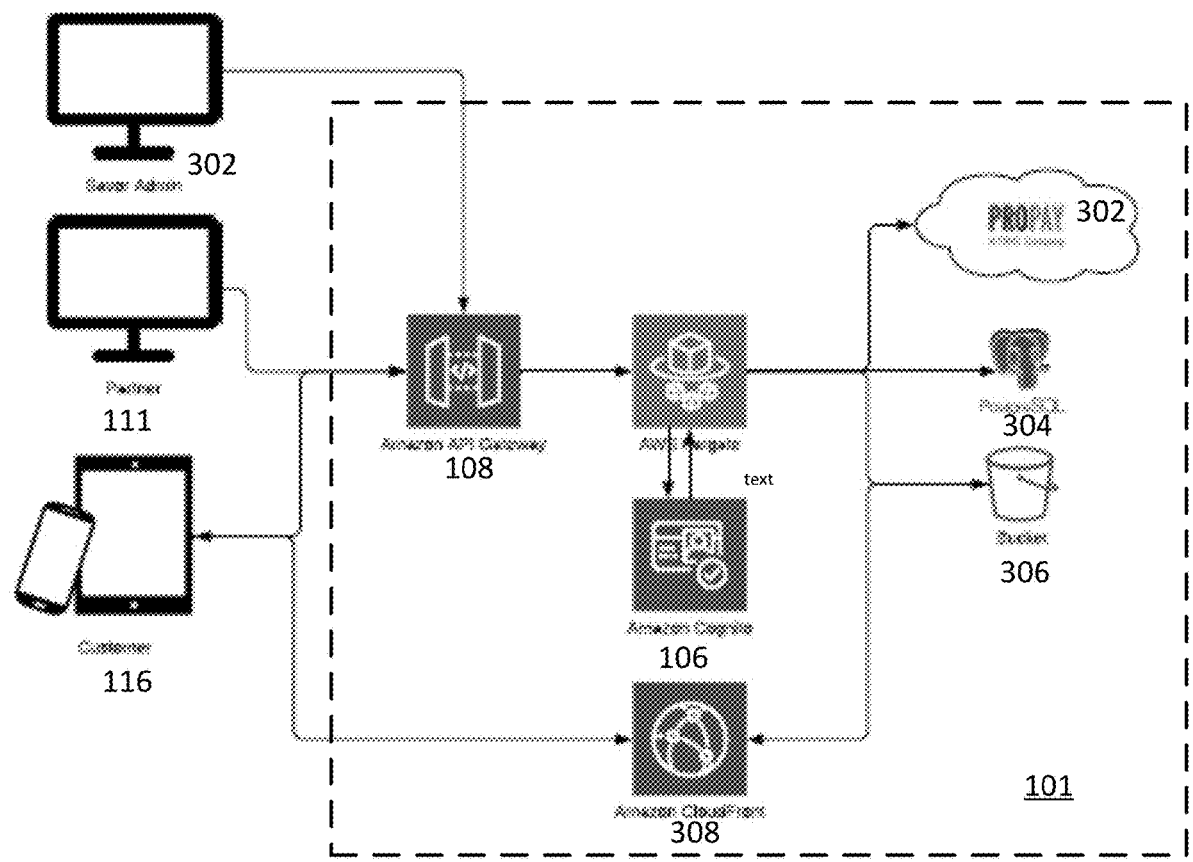
FIG. 3 is a diagram illustrating resources available in the platform of FIG. 1.

FIG. 3 is a diagram illustrating certain resources made available by a cloud implementation of platform 101. As can be seen APIs 108 can provide access to the resources 106 that provide authentication, authorization, user management, etc., for the mobile ordering and payment facilitation applications (132) running on user devices 116 and partner devices 111, which can include some or all of the aspects of user system 130.

APIs 108 can also provide access to payment processing 302, and database resources 304. And a content engine 308 can securely deliver content to applications 116.

Figure 6A:
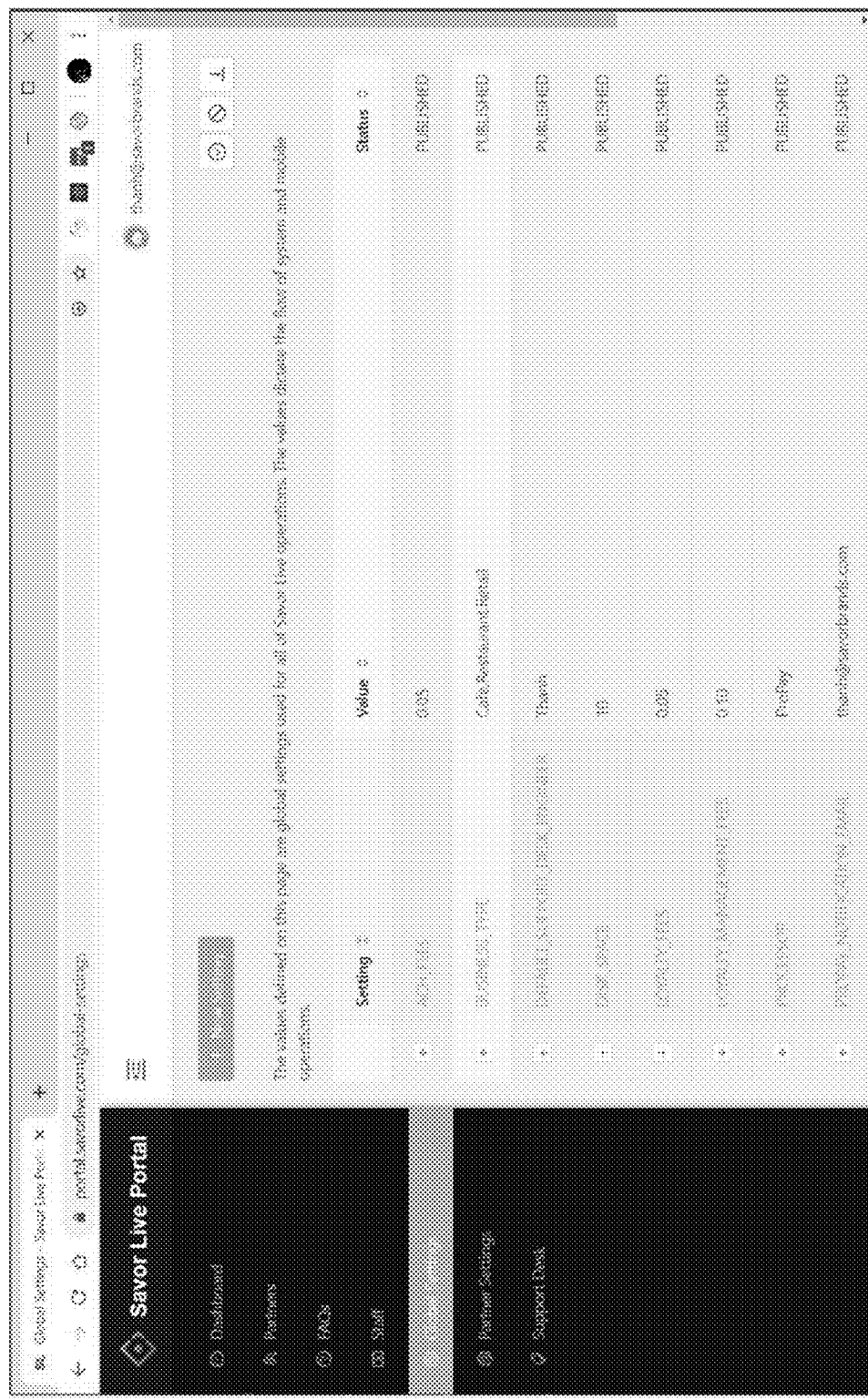
FIGS. 6A-6C are screen shots illustrating screens from an administrator User Interface (U/I) according to one example implementation.
Figure 6B:
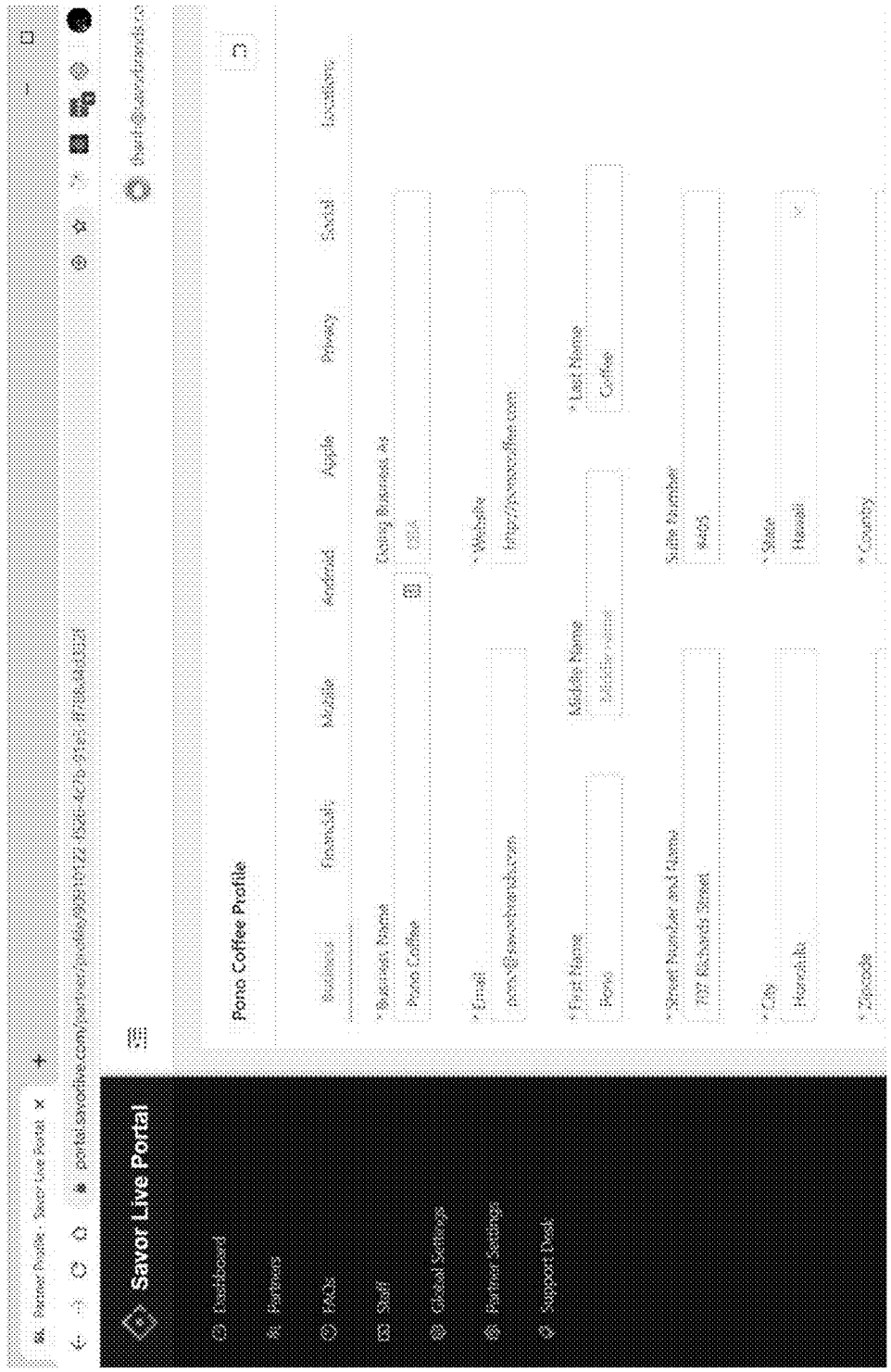

An administrator can access an administrator portal via an administrator system 302 to onboard new partners 111. The administrator can set up the global settings for the new partner as illustrated in FIG. 6A and then enter more detailed information for the new partner as illustrated in the screen shot of FIG. 6B. Other screens that part of the administrator portal UI allow the administrator to financial information, location details, and mobile settings.

Figure 6C:
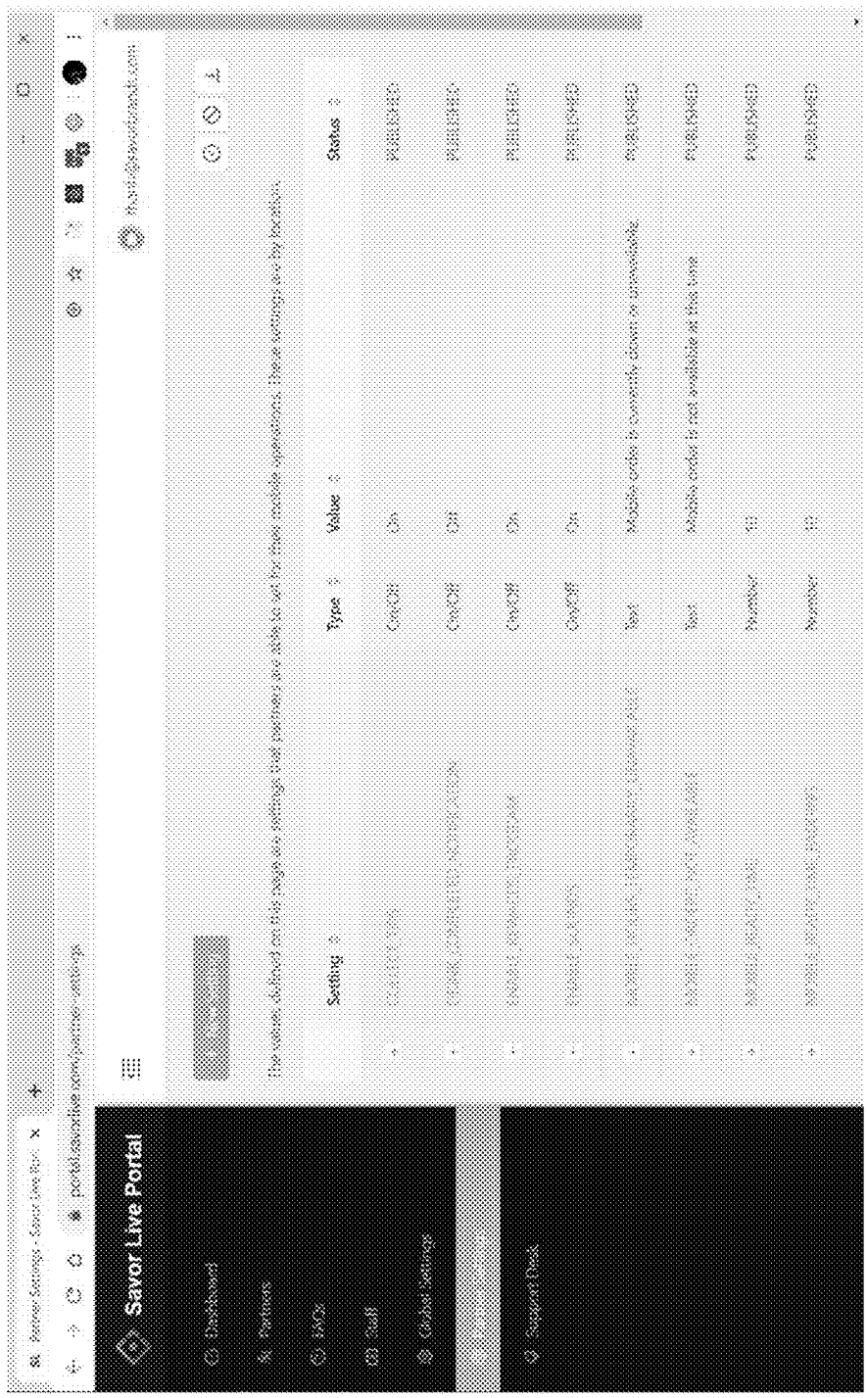
Figure 7A:
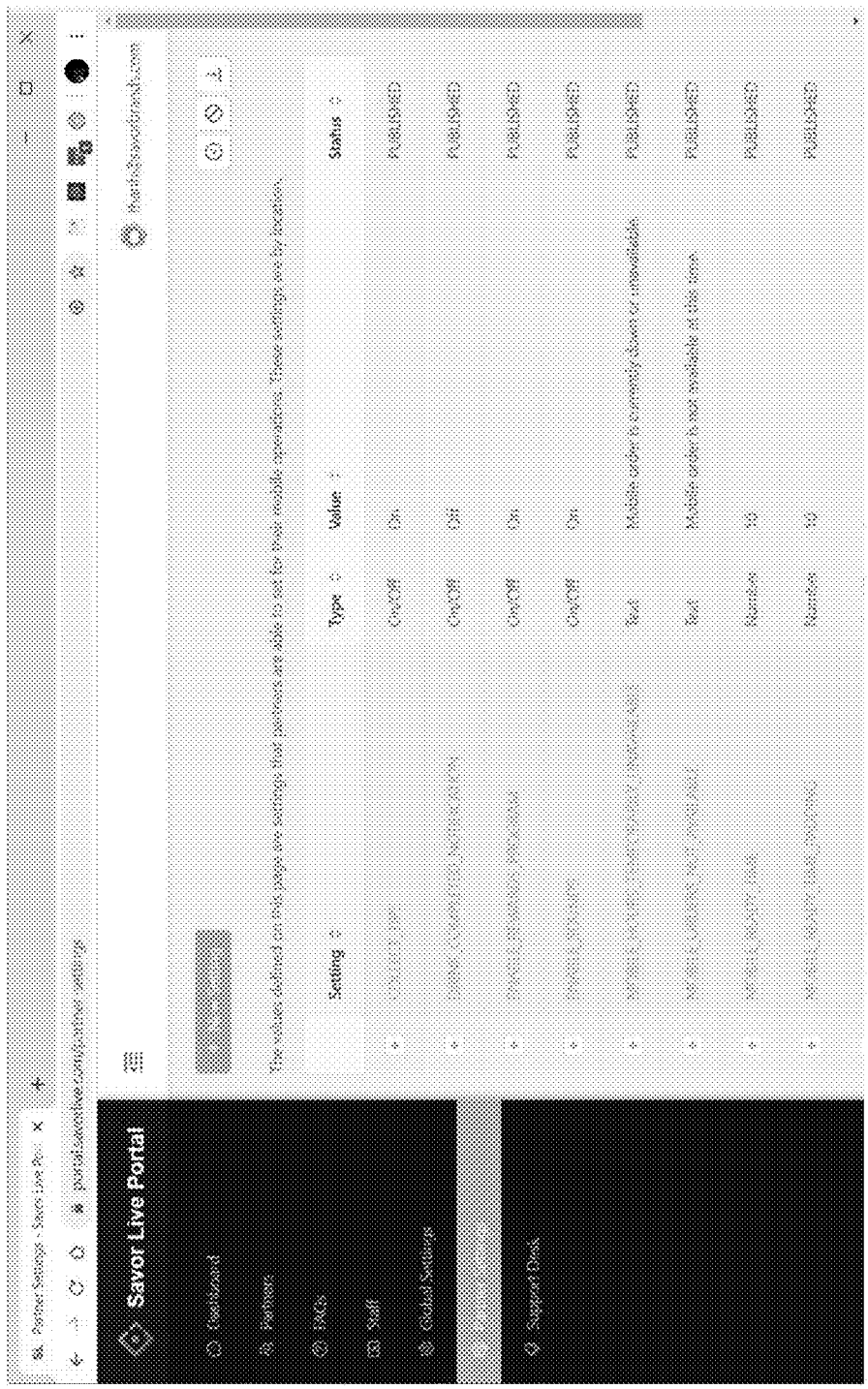

FIG. 6C is a screen shot illustrating settings that partner can be enabled to set for their mobile operations. As illustrated in the screen shot of FIG. 7A, the partner, via eth partner device/system 11 can then configure these settings of their mobile customers. The partner can also define, through a partner portal menu items, availability, pricing, rewards, availability, recommendations, e.g., based on prior orders, order modifiers, etc.

Figure 7B:
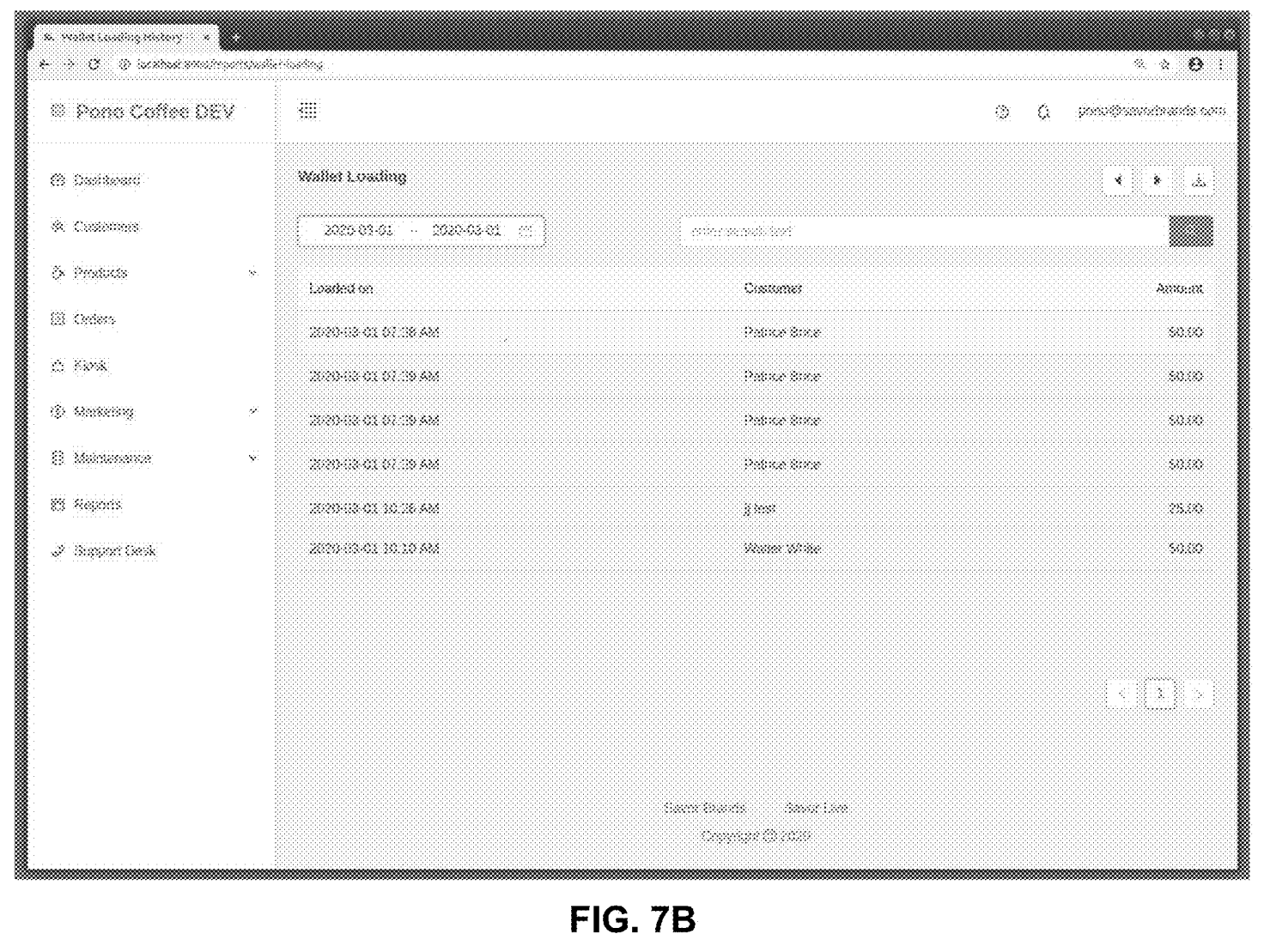

A partner can also monitor orders, fulfillment time, including by employee, sales, etc. The partner can also monitor the status of the customers wallets as illustrated in the screen shot of FIG. 7B.

Thus, as noted, the customer is directly integrated with the partners POS and ordering system. Thus, when a customer, e.g., scans their camera over a product, views the video and/or other information, hits order, the order goes directly into the POS system and comes up as an order on a partner device 111. In placing the order, the user can use their wallet and thus the partner is paid right away. But moreover, when that user goes home, the partner can see the order, and push out rewards, which can go directly into the customer's wallet, recommendations, offers, updated videos or information about the product they scanned and/or purchased, etc.

While certain embodiments have been described above, it will be understood that the embodiments described are by way of example only. Accordingly, the systems and methods described herein should not be limited based on the described embodiments. Rather, the systems and methods described herein should only be limited in light of the claims that follow when taken in conjunction with the above description and accompanying drawings.

What is claimed is:

1. An ordering and payment facilitation system comprising:
    storage;
    a plurality of user devices;
    a plurality of resources;
    one or more servers;
    one or more partner devices associated with one or more partner premises;
    a back end application; and
    a front end application hosted on the one or more user devices and connected to the back end application,
    wherein the front end application is configured to: (i) enable a user to activate a trigger associated with a product by accessing a camera of the one of the plurality of user devices and, in response to the user waving the camera over a trigger image associated with the product, activating the trigger, (ii) in response to the user activating the trigger, enabling the user to place an order for the product, and (iii) in response to the user placing the order, transmit the order directly to the back end application, and
    wherein the back end application is configured to: in response to receiving the order from the front end application, enable a partner to fulfill the order,
    wherein the front end application is further configured to: in response to the user activating the trigger, provide the user with a video via the one of the plurality of user devices, and
    wherein front end application is further configured to: change the video based on a number of times the user activates the trigger.

2. The system of claim 1, wherein the front end application is configured to enable the partner to fulfill the order by enabling one or more employees of the partner to fulfill the order.

3. The system of claim 1, wherein the front end application is further configured to: in response to the user activating the trigger, provide the user with an augmented reality experience and information related to the product via the one of the plurality of user devices.

4. The system of claim 1, wherein the trigger image associated with the product comprises a logo.

5. The system of claim 1, wherein the video comprises an animation of the trigger image.

6. The system of claim 1, wherein the video comprises one or more of: a background of the product, instructions for using the product, a recipe that includes the product, and an experience of the product from a purchaser.

7. The system of claim 1, wherein enabling the user to place the order comprises including a buy or reorder button in the video.

8. The system of claim 1, wherein the front end application is configured to enable a partner administrator associated with the one or more partner devices to configure a plurality of product triggers, including the trigger associated with the product.

9. The system of claim 1, further comprising a front end fulfillment application connected to the back end application, wherein enabling the partner to fulfill the order comprises at least enabling an employee of the partner to view the order via the front end fulfillment application.

10. The system of claim 9, wherein the front end fulfillment application is further configured to provide order fulfillment timing information.

* * * * *